(No Model.)
W. TOZER & F. B. & H. STANTON.
WHEEL.
No. 553,295.   Patented Jan. 21, 1896.
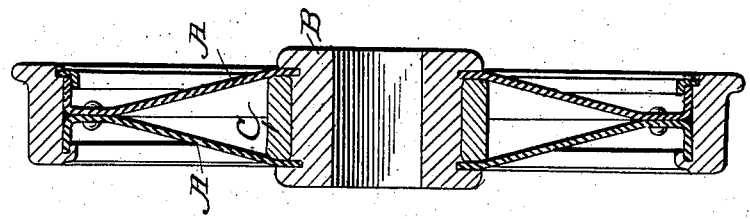
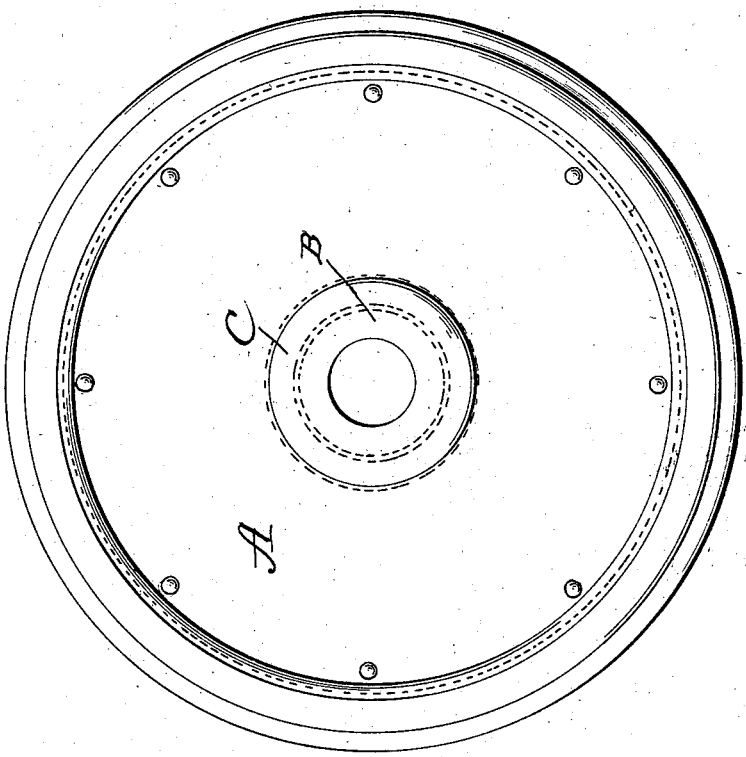
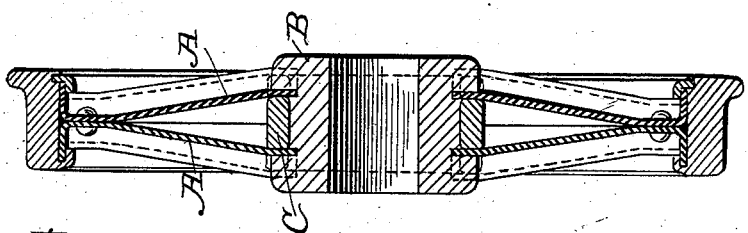
Attest  
Inventors:  
William Tozer  
Frederic Barry Stanton  
Herbert Stanton  
by Richards & Co. Attys

UNITED STATES PATENT OFFICE.

WILLIAM TOZER, FREDERIC BARRY STANTON, AND HERBERT STANTON, OF LONDON, ENGLAND.

WHEEL.

SPECIFICATION forming part of Letters Patent No. 553,295, dated January 21, 1896.

Application filed June 22, 1895. Serial No. 553,734. (No model.) Patented in Belgium July 10, 1891, No. 95,576, and October 31, 1891, No. 97,021; in England August 31, 1891, No. 14,722, and in France November 30, 1892, No. 212,787.

*To all whom it may concern:*

Be it known that we, WILLIAM TOZER, FREDERIC BARRY STANTON, and HERBERT STANTON, of London, England, have invented an Improvement in Wheels, (for which we have received a patent in Great Britain, No. 14,722, dated August 31, 1891; in Belgium, No. 95,576, dated July 10, 1891, and No. 97,021, dated October 31, 1891, and in France, No. 212,787, dated November 30, 1892,) of which the following is a specification.

Our invention relates to wheels and the method of making the same, and while we have shown the invention in connection with a railway-wheel it may be carried out with wheels for other purposes.

The invention consists broadly of a wheel made up of two disks with a space block or ring between the central portions and a hub forged or cast in place and in connection with said parts.

The invention consists also in the method of making the said wheel.

In the drawings, Figure 1 is a sectional view through the wheel having corrugated disks. Fig. 2 is a side view of a wheel with plain disks, and Fig. 3 is a sectional view of Fig. 2.

Our invention relates particularly to the structure of the web and hub or nave, and from Fig. 1 it will be seen that the web connecting the hub with the rim is formed of two disks A secured together at or near their outer edges by rivets or in any other desired way and fastened to the rim or tire in any desired manner, the central portions of the disks being held apart by a space-ring or annular block C. The hub or nave B is forged or cast in the central openings of the disks and in contact with the space-ring and the central portions of the disks.

In carrying out the method of manufacture the disks are placed back to back, secured together with the ring-block between their central portions, and the hub is then forged in place, part of the metal of the hub bearing on the outer sides of the disks and part being in contact with the ring C and in between the disks. The disks may be corrugated, as in Fig. 1, or plain, as in Figs. 2 and 3.

We claim—

1. A wheel comprising a suitable rim or tire the disks, the space ring C between them and the nave or hub forged in place centrally of the disks, said hub being integral from end to end substantially as described.

2. A wheel comprising a suitable rim or tire the disks, the space ring C between them and the nave or hub forged in place centrally of the disks and engaging the outer faces thereof and the space ring, said hub being integral from end to end substantially as described.

In witness whereof we have hereunto set our hands in presence of two witnesses.

WILLIAM TOZER.
FREDERIC BARRY STANTON
HERBERT STANTON.

Witnesses:
E. H. WEST,
J. D. C. MASON.